May 9, 1944.  D. M. KNOX  2,348,481
LUBRICATED VALVE
Filed July 2, 1943
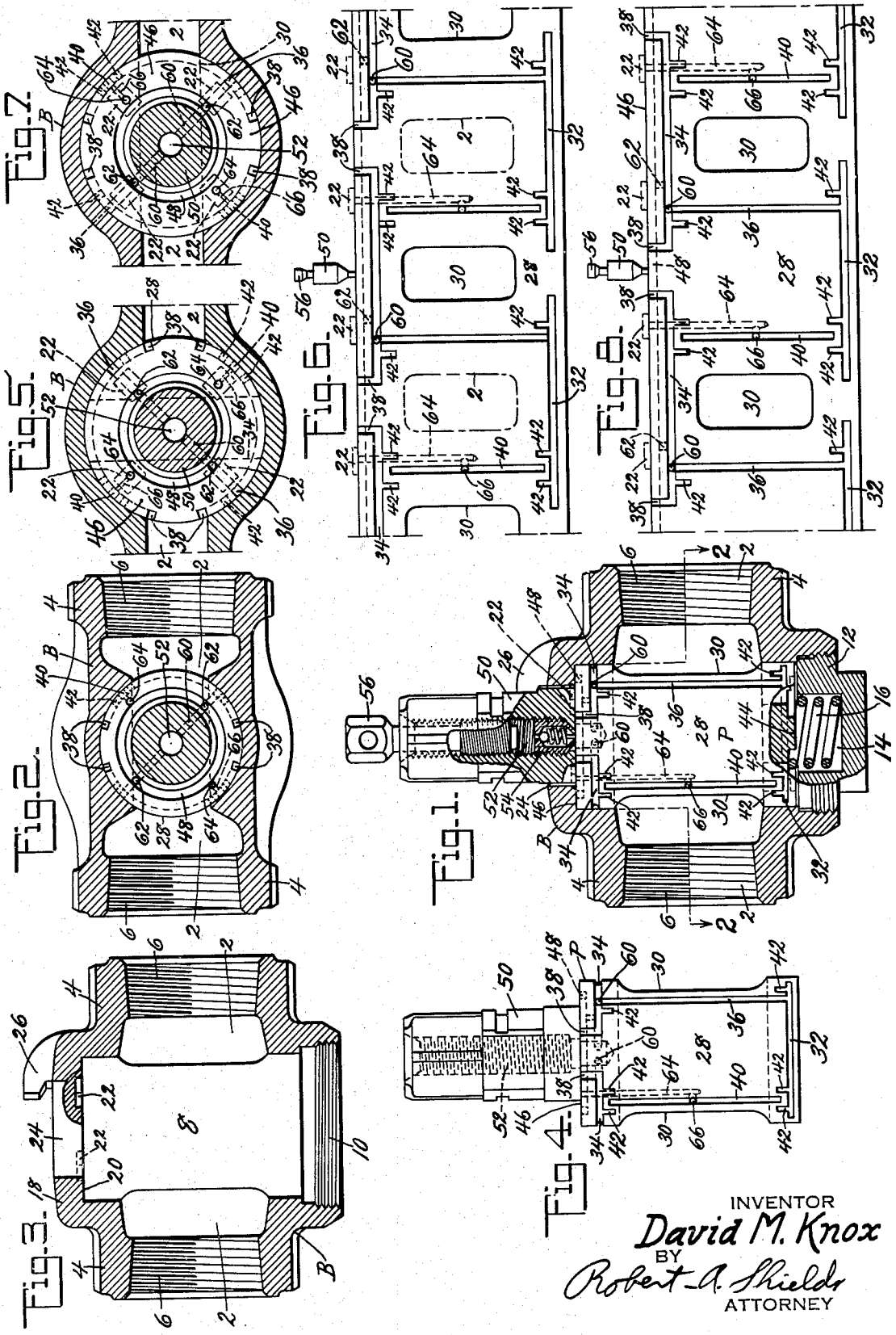
INVENTOR
David M. Knox
BY
Robert A. Shields
ATTORNEY Patented May 9, 1944

2,348,481

UNITED STATES PATENT OFFICE 2,348,481

LUBRICATED VALVE

David M. Knox, New York, N. Y., assignor to American Car and Foundry Company, New York, N. Y., a corporation of New Jersey Application July 2, 1943, Serial No. 493,218

9 Claims. (Cl. 251—93)

This invention relates to valves in general and in particular to lubricated valves of the cylindrical type.

In all lubricated valves if S leaks are to be prevented it is necessary that part of the lubrication system be exposed to line fluid during turning of the plug. This is true whether the grooves or ducts supplying lubricant are in the body or plug of the valve. With the grooves or ducts exposed to line fluid a small amount of lubricant will necessarily be washed out but this washout may be minimized by a proper design of the lubrication system. It is an object, therefore, of the present invention to provide a new and improved lubricated valve in which the lubricant supplying ducts are so arranged as to wholly isolate the exposed ducts or grooves when such ducts are exposed to line fluid.

A further object of the invention is the provision of a new and improved valve with a lubricating system constantly supplied with lubricant at all times and effectively covering the major portion of the seating surfaces of the plug and body.

A still further object of the invention is the provision of a lubricated valve having arrangement to effectively smear lubricant over the seating surfaces of the plug and body, particularly at those areas between the exposed and non-exposed grooves or ducts.

These and other objects of the invention will be apparent to persons skilled in the art from a study of the following description and accompanying drawing, in which Figure 1 is a partial sectional view of the improved valve;

Fig. 2 is a sectional view taken substantially on line 2—2 of Fig. 1;

Fig. 3 is an elevational sectional view of the valve body;

Fig. 4 is an elevational view of the improved valve plug;

Fig. 5 is a partial sectional view similar to Fig. 2 but showing the valve in closed position;

Fig. 6 is a development of the seating surfaces showing the relation of parts when the valve is closed;

Fig. 7 is a partial sectional view similar to Fig. 5 but showing the valve in open position as in Figs. 1 and 2, and Fig. 8 is a development of the seating surfaces with the valve in the open position as shown in Fig. 7.

Referring now to the drawing in detail, it will be seen that the valve is constructed of two main parts, namely, the body B and plug P. As clearly shown, the body is made in one piece and has a passageway 2 extending therethrough and defined at its outer ends by flanges 4 internally threaded as at 6 to receive piping by means of which the valve body may be connected into any system. Extending at right angles to the passageway 2 is a bore suitably finished to provide seating surfaces 8, which surfaces are, of course, interrupted by the passageway 2. However, uninterrupted surfaces are provided in the bore both above and below the passageway 2. The lower end of the bore is counter-bored and threaded as at 10 to receive a cap 12 internally recessed as at 14 to receive a compression spring 16. The upper end of the bore is partially closed by the head portion 18 of the body. This head portion has the inner surface suitably finished to provide a body head seating surface 20 which is interrupted by four cavities 22. The surface is also interrupted by an opening 24 extending through the head and adapted to receive the stem of the plug later to be referred to. Rotation of the plug in the body is limited to substantially ninety degrees by means of a stop 26 formed on the body and with the inner end overlapping the opening 24.

The plug P, in the present instance, is of cylindrical form having an outer cylindrical seating surface 28 interrupted by a passageway 30 extending diametrically through the plug and of a cross sectional area substantially identical to that of passageway 2 in the body. The cylindrical seating surface 28 is also interrupted by a plurality of lubricant conducting grooves distributed over the surface in a manner now to be described. Discontinuous circumferential grooves 32 and 34 interrupt the seating surface 28 adjacent the lower and upper edges respectively of the plug. These discontinuous circumferential grooves are connected at diametrically opposed points by comparatively long longitudinal grooves 36 interrupting the seating surface 28 adjacent one side of the passageway 30. The discontinuous grooves 32 and 34 and connecting longitudinal grooves 36 are so arranged as to form in effect roughly Z-shaped grooves so arranged that the flanges of the Z, namely, grooves 32 and 34, overlap each other. This overlapping relationship is clearly shown in Figs. 6 and 8. In order to conduct lubricant from the discontinuous circumferential grooves 34 to the top edge of the plug short grooves 38 extend upwardly from the ends of the short circumferential grooves 34, thus in effect forming with 34 a U-shaped upper groove. These upwardly directed grooves 38 will effectively smear the cylindrical seating surface 28 between the upper edge of the plug and the short circumferential groove 34. To prevent S leaks comparatively short longitudinal grooves 40 interrupt the seating surface 28 of the plug at diametrically opposed points adjacent the sides of passageway 30. These short longitudinal grooves do not connect with any of the grooves on the seating surface 28 and are only supplied with lubricant at certain times as will later be pointed out. In order to effectively smear the seating surface of the plug and body between the discontinuous circumferential grooves 32, 34 and the edges of the passageway 30, short stub grooves 42 are provided extending downwardly from groove 34 and upwardly from groove 32. Certain of these grooves, as clearly shown in the figures, particularly 1, 4, 6 and 8, overlap the ends of grooves 40; in other words, they form what may be termed overlapping caps for grooves 40, thus effectively preventing any leakage of line fluid from passage 30 past the groove 40. The lower end of the plug is recessed, as is customary in this type, to provide a centrally located spring centering plug 44 and a seating surface adjacent thereto to rest upon the upper end of the compression spring 16 which will urge the plug toward the head of the body when in assembled position. The upper or head end of the plug is carefully finished to provide a seating surface 46 lying in a plane substantially normal to the planes defining the cylindrical seating surface 28. This plug head seating surface 46 is interrupted by an annular groove 48 located adjacent to the stem 50 of the plug and which stem is adapted to extend through the hole 24 previously referred to. The stem is axially bored as at 52 and threaded to receive a check valve assembly 54 and a screw or ram 56 adapted, when turned, to place pressure on lubricant inserted in the hole or axial bore 52. In order to feed lubricant from the axial bore to the various grooves, previously described, diametrically opposed radial holes 60 extend from substantially the intersection of grooves 34 and 36 inwardly to the axial bore 52. These radial holes 60 are tapped by short vertically extending holes 62 extending from the bottom of annular groove 48 downwardly to intersect radial holes 60. Lubricant can be fed to short longitudinal grooves 40 by means of vertical holes 64 extending downwardly from the upper or shoulder seating surface 46 of the plug to a point substantially at the center of groove 40. A short radially extending hole 66 extends from the bottom of short longitudinal groove 40 inwardly to intersect the vertically extending hole 64, all as clearly shown in the figures. As most clearly shown in Figs. 2, 5 and 7, the holes 64 interrupt the upper or head seating surface 46 of the plug at diametrically opposed points located outside of the annular groove 48. The upper ends of these holes 64 are adapted to register with the cavities 22 located in and interrupting the head seating surface 20 of the body, which cavities are of a sufficient length as to overlap and register with the annular groove 48 at all times.

It will be seen from the preceding that lubricant, under pressure exerted by the ram or screw 56, can be forced at all times from axial bore 52 into radial holes 60. From these holes 60 lubricant can pass into upper circumferential grooves 34, relatively long longitudinal grooves 36 and thence into the lower discontinuous circumferential grooves 32. From grooves 34 lubricant can flow upwardly in grooves 38 and downwardly into stub grooves 42. The upwardly turned grooves 38 interrupt the head seating surface 46 and will effectively lubricate the head seating surfaces adjacent their point of contact with the cylindrical seating surfaces of the plug and body. Lubricant can also flow from radial hole 60 through short vertical holes 62 into the annular groove 48 and into cavities 22 formed in the body head. Also, when the valve is in the full open or full closed position the upper ends of holes 64 will register with cavities 22 and lubricant can then flow downwardly through holes 64 and outwardly through short radial holes 66 into the short longitudinal grooves 40. When, however, the valve is in any position other than full open or full closed, the upper ends of holes 64 will move out of register with cavities 22 and be cut off from or isolated from the remainder of the lubricant system. Movement of the plug between full open and full closed will cause an effective smearing of the plug and body seating surfaces by the long longitudinal grooves 36, short upwardly directed grooves 38 and stub grooves 42. Also, the head seating surfaces will be effectively smeared by the upper ends of grooves 38 as well as by cavities 22 filled from the annular groove 48. In this manner the valve seating surfaces are effectively smeared by lubricant fed through the groove or duct system and leakage of the valve between passageways or at the head is effectively prevented.

While the valve has been described more or less in detail with specific reference to a cylindrical type of plug it will be obvious that the groove arrangement and lubricating system could be applied equally well to a tapered type of plug valve. It will also be obvious that various modifications and rearrangements of parts other than those shown and described may be made and all such modifications are contemplated as will fall within the scope of the appended claims defining my invention.

What is claimed is:

1. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, and a plurality of relatively short longitudinal lubricant grooves interrupting said plug seating surface and located between the overlapped ends of the Z-shaped groove arrangement but clear of connection thereto.

2. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but clear of connection thereto, and a plurality of opposed stub longitudinal lubricant grooves connected to the overlapped ends of the Z-shaped groove arrangements and substantially capping the ends of said relatively short longitudinal grooves but free of connection therewith.

3. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but clear of connection thereto, a plurality of opposed stub longitudinal lubricant grooves connected to the overlapped ends of the Z-shaped groove arrangements and substantially capping the ends of said relatively short longitudinal grooves but free of connection therewith, a source of lubricant pressure carried by the plug, and means for supplying lubricant under pressure at all times from said source to said Z-shaped groove arrangements and stub longitudinal grooves.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but free of connection thereto, an annular lubricant groove interrupting said plug head seating surface and overlapping said cavities, a source of lubricant pressure carried by the plug, means for supplying lubricant under pressure at all times to said annular groove, said cavities, and said Z-shaped groove arrangements, and additional means for supplying lubricant from said cavities to said relatively short longitudinal grooves when said valve is in substantially full open or closed position.

5. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but free of connection thereto, an annular lubricant groove interrupting said plug head seating surface and overlapping said cavities, a source of lubricant pressure carried by the plug, means for supplying lubricant under pressure at all times to said annular groove, said cavities, and said Z-shaped groove arrangements, and additional means for supplying lubricant from said cavities to said relatively short longitudinal grooves when said valve is in substantially full open or closed position, said additional means including longitudinal holes connected to said relatively short longitudinal grooves and interrupting said plug head seating surface intermediate said annular groove and the periphery of the plug head seating surface.

6. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but free of connection thereto, an annular lubricant groove interrupting said plug head seating surface and overlapping said cavities, a source of lubricant pressure carried by the plug, means for supplying lubricant under pressure at all times to said annular groove, said cavities, and said Z-shaped groove arrangements, and additional means for supplying lubricant from said cavities to said relatively short longitudinal grooves when said valve is in substantially full open or closed position, said additional means including longitudinal holes connected to said relatively short longitudinal grooves and interrupting said plug head seating surface intermediate said annular groove and the periphery of the plug head seating surface, and said additional means being cut off from connection with said cavities by said body head seating surface when said plug is moved to a position other than substantially full open or closed position.

7. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but free of connection thereto, an annular lubricant groove interrupting said plug head seating surface and overlapping said cavities, a source of lubricant pressure carried by the plug, means for supplying lubricant under pressure at all times to said annular groove, said cavities, and said Z-shaped groove arrangements, additional means for supplying lubricant from said cavities to said relatively short longitudinal grooves when said valve is in substantially full open or closed position, and stub grooves connected to said Z-shaped groove arrangements and capping the ends of said relatively short longitudinal grooves in spaced relation therewith.

8. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, a plurality of relatively short longitudinal lubricant grooves interrupting said plug seating surface and located between the overlapped ends of the Z-shaped groove arrangement but free of connection thereto, an annular lubricant groove interrupting said plug head seating surface and overlapping said cavities, a source of lubricant pressure carried by the plug, means for supplying lubricant under pressure at all times to said annular groove, said cavities, and said Z-shaped groove arrangements, additional means for supplying lubricant from said cavities to said relatively short longitudinal grooves when said valve is in substantially full open or closed position, and stub grooves connected to said Z-shaped groove arrangements and capping the ends of said relatively short longitudinal grooves in spaced relation therewith, said stub grooves operating during movement of the plug to smear lubricant over the seating surfaces and prevent leakage of matter past the ends of said relatively short longitudinal grooves.

9. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of discontinuous circumferential lubricant grooves interrupting said plug seating surface adjacent the upper and lower ends thereof and arranged in staggered overlapping relationship, longitudinal lubricant grooves interrupting said plug seating surface and connecting said discontinuous circumferential grooves together in pairs to provide a plurality of substantially Z-shaped groove arrangements, and short lubricant grooves extending upwardly substantially from the ends of said discontinuous circumferential lubricant grooves, certain of said short grooves interrupting the plug head seating surface adjacent the perimeter thereof for the purpose of supplying lubricant thereto.

DAVID M. KNOX.